(12) United States Patent
Koehler et al.

(10) Patent No.: US 11,864,546 B2
(45) Date of Patent: *Jan. 9, 2024

(54) MULTI-COLOR INSECT LIGHT TRAP

(71) Applicant: Florida Insect Control Group LLC, Gainesville, FL (US)

(72) Inventors: Philip G. Koehler, Gainesville, FL (US); Enrico Paolo Levi, Modena (IT)

(73) Assignee: Florida Insect Control Group LLC, Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,916

(22) Filed: Mar. 29, 2023

(65) Prior Publication Data

US 2023/0284606 A1 Sep. 14, 2023

Related U.S. Application Data

(63) Continuation-in-part of application No. 17/519,256, filed on Nov. 4, 2021, now Pat. No. 11,751,555.
(Continued)

(51) Int. Cl.
*A01M 1/08* (2006.01)

(52) U.S. Cl.
CPC ......... *A01M 1/08* (2013.01); *A01M 2200/012* (2013.01)

(58) Field of Classification Search
CPC .......... A01M 1/145; A01M 1/08; F21V 15/01
See application file for complete search history.

(56) References Cited

U.S. PATENT DOCUMENTS 5,525,145 A  6/1996  Hodge
6,241,794 B1 6/2001  Jadran
(Continued)

OTHER PUBLICATIONS

Muir et al., Aedes aegypti (Diptera: Culicidae) Vision: Spectral Sensitivity and Other Perceptual Parameters of the Female Eye, J. Med., Entomol, pp. 278-281, 1992.
(Continued)

*Primary Examiner* — Christopher E Dunay
(74) *Attorney, Agent, or Firm* — Brian S. Steinberger; Hilary F. Steinberger; Law Offices of Brian S. Steinberger, P.A.

(57) ABSTRACT

Systems, devices, and methods for using insect traps with combinations of dual multi-colored lights combining blue/green LED (light emitting diodes) with UV (ultraviolet) LEDs (light emitting diodes) for attracting insects to the lights and capturing the insects. The blue/green LED can emit at a wavelength of approximately 450 nm to approximately 550 nm in an approximately 180 degrees spread therefrom, and each side UV LED can emit at a wavelength of approximately 365 nm in an approximately 180 degrees spread therefrom. The combinations of multi-color lights can be mounted on one side of a module/fixture, and/or be mounted on opposite side faces of a module fixture. The combinations can use one centrally located blue/green LED with at least one right UV LED to a right side of the centrally located blue/green LED, and at least one left UV LED to a left side of the centrally located blue/green LED. Embodiments can include use on a sticky paper/card, in a housing with fan, and collection tray, and in an electrical gride of wires having a collection tray and sand mesh bag with an approximately 340 micron mesh screen. Embodiments include a plurality of UV (ultraviolet) LEDs (light emitting diodes) greater than the plurality of blue-green LEDs (light emitting diodes).

16 Claims, 9 Drawing Sheets

Related U.S. Application Data

(60) Provisional application No. 63/194,505, filed on May 28, 2021.

(56) References Cited

U.S. PATENT DOCUMENTS

| | | | |
|---|---|---|---|
| 6,357,889 | B1 | 3/2002 | Duggal |
| 9,832,986 | B2 | 6/2017 | Koo |
| 9,706,764 | B2 | 7/2017 | Koo et al. |
| 9,717,228 | B2 | 8/2017 | Koo et al. |
| 10,178,859 | B2 | 1/2019 | Koo |
| 10,827,738 | B2 | 11/2020 | Kim |
| 10,905,111 | B2 | 2/2021 | Zhang |
| 10,986,828 | B1 | 4/2021 | Studer |
| 2005/0126068 | A1* | 6/2005 | Welch ................ A01M 1/223 43/112 |
| 2009/0025275 | A1* | 1/2009 | Cohnstaedt ............ A01M 1/04 43/113 |
| 2018/0177175 | A1* | 6/2018 | Tsai ...................... A01M 1/20 |
| 2018/0184635 | A1 | 7/2018 | Studer et al. |
| 2019/0075776 | A1* | 3/2019 | Ali ...................... A01M 1/145 |
| 2019/0350184 | A1* | 11/2019 | Chang .................. A01M 1/02 |
| 2020/0138003 | A1* | 5/2020 | Shoemaker, Jr. ... G09F 13/0413 |
| 2020/0305406 | A1* | 10/2020 | Ritchie ............... A01M 1/145 |
| 2021/0368763 | A1* | 12/2021 | Fish .................. A01M 1/145 |
| 2021/0392866 | A1* | 12/2021 | Kaye .................. A01M 1/02 |
| 2022/0132824 | A1* | 5/2022 | Toledo ............... A01M 1/145 43/113 |

OTHER PUBLICATIONS

Edwards, John, At Last! A Safe Solution to Zap Away Those Mosquitos and Pesky Bugs. It Really Works! FuzeBug, advertorial, May 23, 2021, 1-9.

* cited by examiner

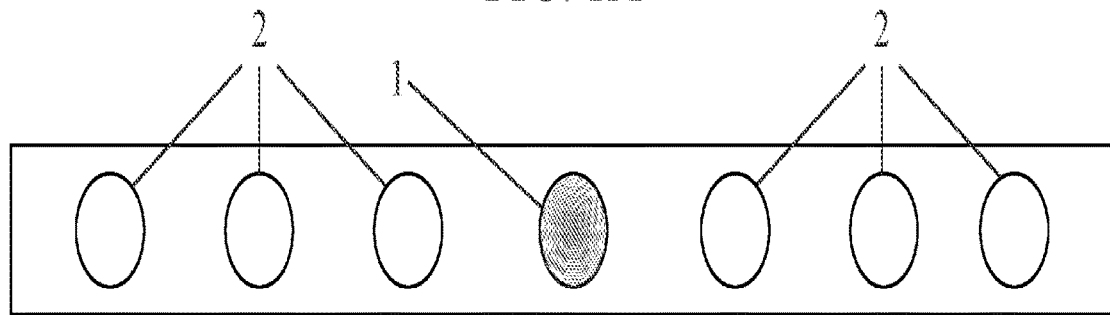
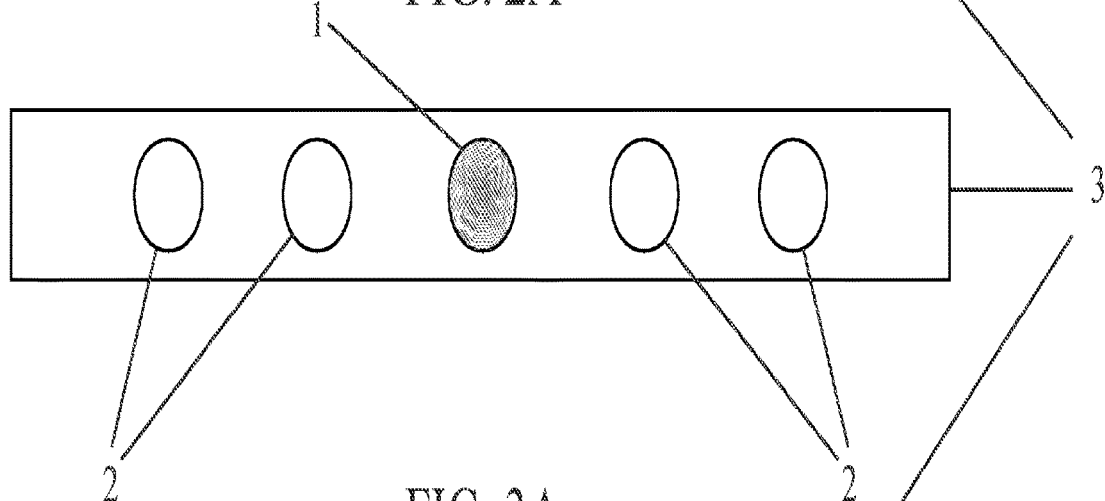
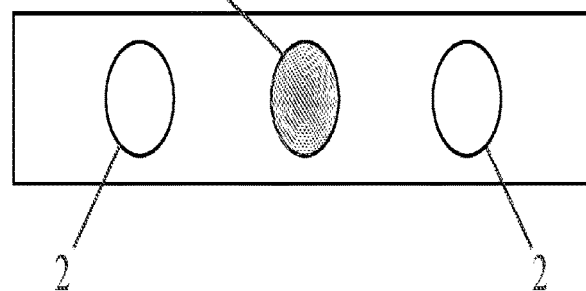

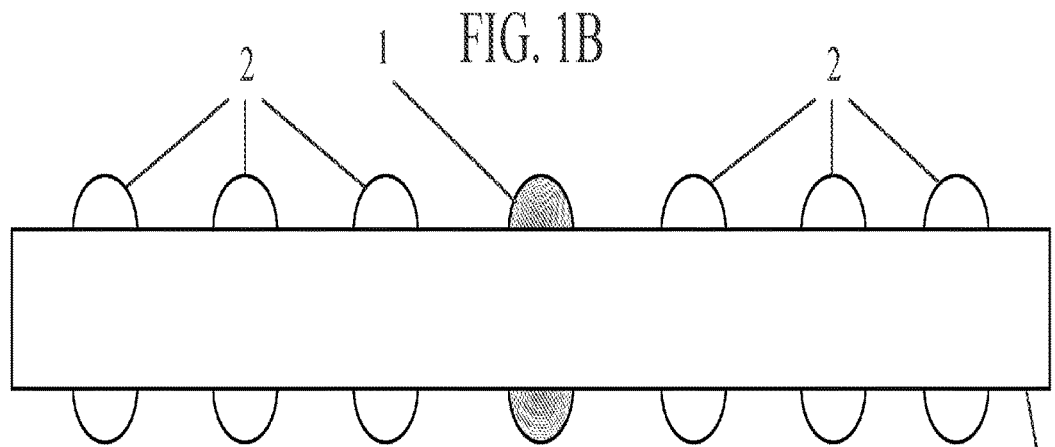
FIG. 1B
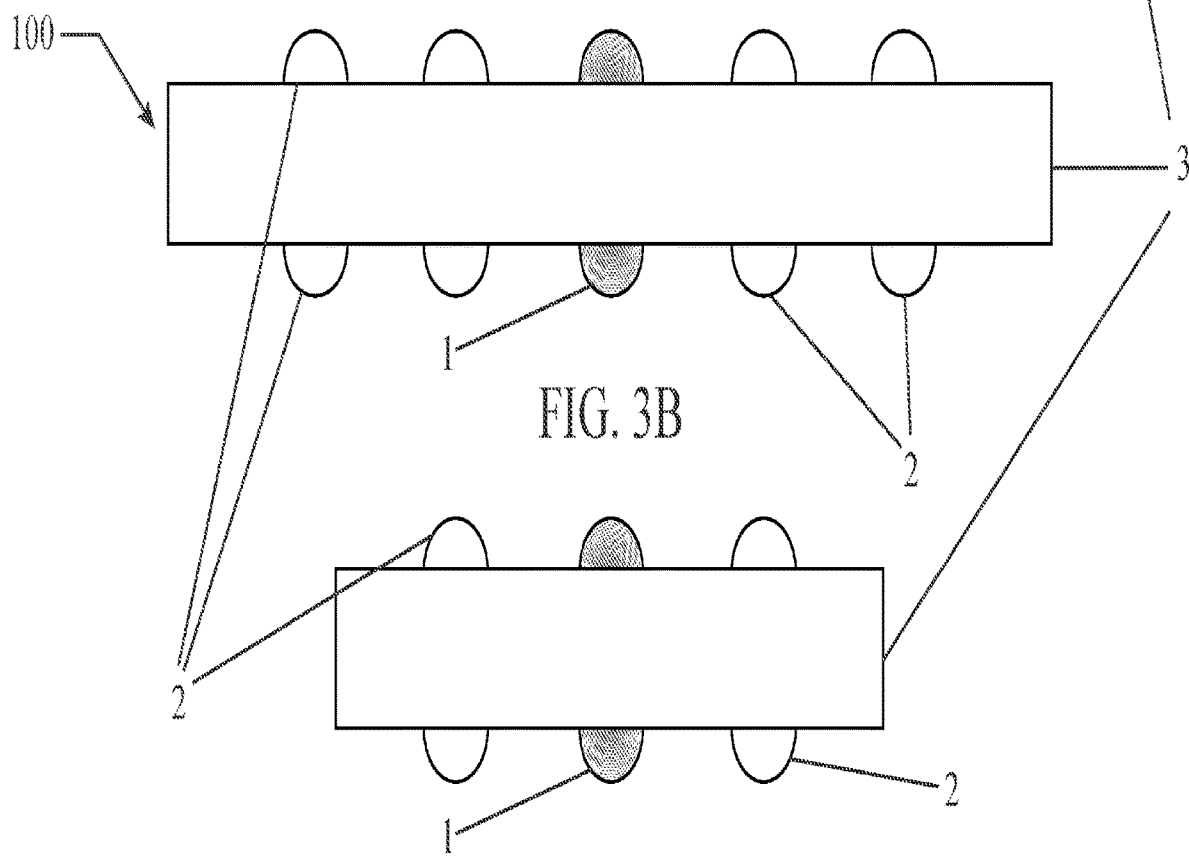
FIG. 2B
FIG. 3B a = Blue/Green Light LED b = UV Light LED a = Blue/Green Light LED b = UV Light LED

MULTI-COLOR INSECT LIGHT TRAP

CROSS REFERENCE TO RELATED APPLICATIONS

This application is a Continuation-In-Part of U.S. patent application Ser. No. 17/519,256 filed Nov. 4, 2021, now allowed, which claims the benefit of priority to U.S. Provisional Application Ser. No. 63/194,505 May 28, 2021, which is incorporated herein by specific reference thereto.

FIELD OF INVENTION

This invention relates to insect traps, and in particular to systems, devices, and methods for using insect traps with combinations of dual multi-colored lights combining blue/green LED (light emitting diodes) with UV (ultraviolet) LEDs (light emitting diodes) for attracting insects to the lights and capturing the insects.

BACKGROUND AND PRIOR ART

Insect traps using UV (ultra violet) LED (light emitting diodes) lamps have been proposed over recent years. See for example, U.S. Pat. No. 9,706,764 to Koo et al.; U.S. Pat. No. 9,717,228 to Koo et al.; and 9,832,986 to Koo et al., which are incorporated by reference.

The UV (ultra violet) LED (light emitting diodes) in these devices are generally limited to wavelengths of between 335 to 395 nm, and do not cover other wavelengths visible to insects needed for attracting insects.

Attempts have been proposed to use LED (light emitting diode) groups having different wavelengths for attracting insects. See U.S. Pat. No. 10,986,828 to Studer et al. and U.S. Published Patent Application 2018/0184635 to Stud et al., which are both incorporated by reference.

The Studer et al. patent requires a translucent tubular sleeve around the LEDS which acts as a filter to limit and cut-down on the light transmission rays from the LEDs.

The Studer et al. published patent application limits the field by placing the LEDs into of a housing having narrow aperture openings which further limits the direction and spread of light passing from the LEDs.

Japan patent 2016 208944 to Maya Arakane describes a simple device for emitting a mixed wave of ultraviolet visible light that appears to require a cover 4/5 that would further inhibit the light rays and spread from the LEDs (light emitting diodes.

LEDs emit light in a very narrow pencil thin width of light. Insects do not fly directly along a line to the light source.

LEDs produce mainly monochromatic light, meaning that the wavelengths of light are produced in a narrow nanometer range. For this reason, fluorescent bulbs are usually used in light traps. Those fluorescent bulbs produce light in broad bands. But fluorescent bulbs need to be replaced often because the UV output shifts.

Not all the attractive wavelengths of light are in the ultraviolet. So, UV light traps are not as effective as those with broad light output.

Mosquito mesh on cages that catch mosquitoes allow sand flies to escape. The sand fly is really small and it can squeeze through mosquito mesh. The current technologies do not capture sand flies.

Light provided by LEDs is usually pinpoint so insects cannot follow it into the trap.

Thus, the need exists for solutions to the above problems with the prior art.

Our invention spreads the light from the LEDs so insects can follow the light to the source (trap). Most LED light sources are directional and do not attract insects in a close to 360 degree area around the trap. The orientation of our LED plus the spread of light attracts insects from a wider area.

SUMMARY OF THE INVENTION

A primary objective of the present invention is to provide systems, devices, and methods for using an insect trap with combinations of dual multi-colored lights combining blue/green LED (light emitting diodes) with UV (ultraviolet) LEDs (light emitting diodes) for attracting insects to the lights and capturing the insects.

A secondary objective of the present invention is to provide systems, devices, and methods for using an insect trap with combinations of dual multi-colored lights combining blue/green LED (light emitting diodes) with UV (ultraviolet) LEDs (light emitting diodes) on a module without any lens, covers or other materials for inhibiting light emissions from the LEDs, for attracting insects to the lights and capturing the insects.

A third objective is to spread the light so there is a uniform beam that covers a wide area around the lights in the trap.

A fourth objective is to orient the wide beams of light so an almost 360 degree of light surrounds the trap to attract the most insects.

The light receptors in the mosquito and other flying insect eyes are broad and extend over a wider range of wavelengths than produced by LEDs.

The muliticolor light trap utilizing UV and Blue LEDs extends the produced wavelengths to those more closely aligned with the wide range light receptors of the insect eye.

Blending the attractive colors of UV and blue improves light trap performance by increasing provided light across the attractive wavelengths.

The approximately 340 micron mesh retains the sand fly (biting midge or noseeum) without inhibiting the suction provided by the fan. Capture of sand flies in our trap is increased by more than 99% by using the approximately 340 micron mesh screen>.

Our LEDs give a 120 degree spread of light so insects can follow the light to the trap.

An embodiment of a dual multi-colored light combining assembly of blue/green LED (light emitting diodes) with UV (ultraviolet) LEDs (light emitting diodes) for attracting insects to the lights and capturing the insects can include: a module/fixture having at least one centrally located blue-green LED for emitting light in a wavelength of approximately 450 nm to approximately 550 nmin in an approximately 180 degrees spread therefrom; at least one left side UV-LED to a left side of the at least one centrally located blue-green LED for emitting a light in a wavelength of approximately 365 nm in an approximately 180 degrees spread therefrom; and at least one right side UV-LED to a right side of the at least one centrally located blue-green LED for emitting a light in a wavelength of approximately 365 nm in an approximately 180 degrees spread therefrom.

The at least one centrally located blue-green LED, the at least one left side UV-LED, and the at least on right side UV-LED can all be located on one-facing side of the module/fixture.

The at least one centrally located blue-green LED, the at least one left side UV-LED, and the at least on right side UV-LED can all be located on opposite-facing sides of the module/fixture.

One UV-LED can be located to the left of one centrally located blue-green LED, and one UV-LED is located to the right of one centrally located blue-green LED, and are all located on one side face of the module/fixture.

One UV-LED can be located to the left of one centrally located blue-green LED, and one UV-LED is located to the right of one centrally located blue-green LED, and are all located on both opposite side faces of the module/fixture.

Two UV-LEDs can be located to the left of one centrally located blue-green LED, and two UV-LEDs can be located to the right of one centrally located blue-green LED, and are all located on one side face of the module/fixture.

Two UV-LEDs can be located to the left of one centrally located blue-green LED, and two UV-LEDs can be located to the right of one centrally located blue-green LED, and all can be located on both opposite side faces of the module/fixture.

The dual multi-colored assembly can further include a planar member having a sticky/tacky surface for mounting the module/fixture thereon.

The dual multi-colored assembly can further include a housing for supporting the module/fixture above a fan which pulls insects into the housing; and a capture cage beneath the fan for capturing the insects.

The dual multi-colored assembly can further include a fine mesh bag about a portion of the capture cage for sand fly capture.

The dual multi-colored assembly can further include a trap having a grill of positive and negatively charged electric wires, wherein the module/fixture is mounted within the grill, and a collector tray for collecting the insects attracted to the LEDs.

A method of using a dual multi-colored light source for capturing insects, can include the steps of: mounting a centrally located blue/green LED (light emitting diode) that emits light in a wavelength between approximately 450 nm to approximately 55 nm in an approximately 180 degrees spread on a module/fixture; mounting at least one left UV-LED to a left side of the centrally located blue-green LED on the module/fixture, the at least one left UV-LED emitting light having a wavelength of approximately 365 nm in an approximately 180 degrees spread; and mounting at least one right UV-LED to a right side of the centrally located blue-green LED on the module/fixture, and the at least one right UV-LED emitting light having a wavelength of approximately 365 nm in an approximately 180 degrees spread.

The method can further include the steps of: mounting two left UV-LEDs to a left side of the centrally located blue-green LED on the module/fixture, each of the two left UV-LED emitting light having a wavelength of approximately 365 nm in an approximately 180 degrees spread; and mounting two right UV-LEDs to a right side of the centrally located blue-green LED on the module/fixture, each of the two right UV-LEDs emitting light having a wavelength of approximately 365 nm in an approximately 180 degrees spread.

The method can further include the steps of: mounting three left UV-LEDs to a left side of the centrally located blue-green LED on the module/fixture, each of the three left UV-LED emitting light having a wavelength of approximately 365 nm in an approximately 180 degrees spread; and mounting three right UV-LEDs to a right side of the centrally located blue-green LED on the module/fixture, each of the three right UV-LEDs emitting light having a wavelength of approximately 365 nm in an approximately 180 degrees spread.

The method can further include the steps of: mounting the centrally located blue/green LED (light emitting diode) that emits light in a wavelength between approximately 450 nm to approximately 55 nm in an approximately 180 degrees spread on opposite sides faces of a module/fixture; mounting at least one left UV-LED to a left side of the centrally located blue-green LED on the module/fixture on opposite sides faces of a module/fixture, the at least one left UV-LED emitting light having a wavelength of approximately 365 nm in an approximately 180 degrees spread; and mounting at least one right UV-LED to a right side of the centrally located blue-green LED on the module/fixture on opposite sides faces of a module/fixture, and the at least one right UV-LED emitting light having a wavelength of approximately 365 nm in an approximately 180 degrees spread.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 1A is a front side view of a first embodiment of an insect attractive lights module arrangement combination of dual multi-colored lights combining blue/green LED (light emitting diodes) with UV (ultraviolet) LEDs (light emitting diodes) for attracting insects to the lights and capturing the insects.

FIG. 1B is a top view of the module of the first embodiment of FIG. 1A showing the arrangement combination of dual multi-colored lights on both sides of the module.

FIG. 2A is a front side view of a second embodiment of an insect attractive lights module arrangement combination of dual multi-colored lights combining blue/green LED (light emitting diodes) with UV (ultraviolet) LEDs (light emitting diodes) for attracting insects to the lights and capturing the insects.

FIG. 2B is a top view of the module of the second embodiment of FIG. 2A showing the arrangement combination of dual multi-colored lights on both sides of the module.

FIG. 3A is a front side view of a third embodiment of an insect attractive lights module arrangement combination of dual multi-colored lights combining blue/green LED (light emitting diodes) with UV (ultraviolet) LEDs (light emitting diodes) for attracting insects to the lights and capturing the insects.

FIG. 3B is a top view of the module of the third embodiment of FIG. 3A showing the arrangement combination of dual multi-colored lights on both sides of the module.

DESCRIPTION OF THE PREFERRED EMBODIMENTS

Figure 2C:
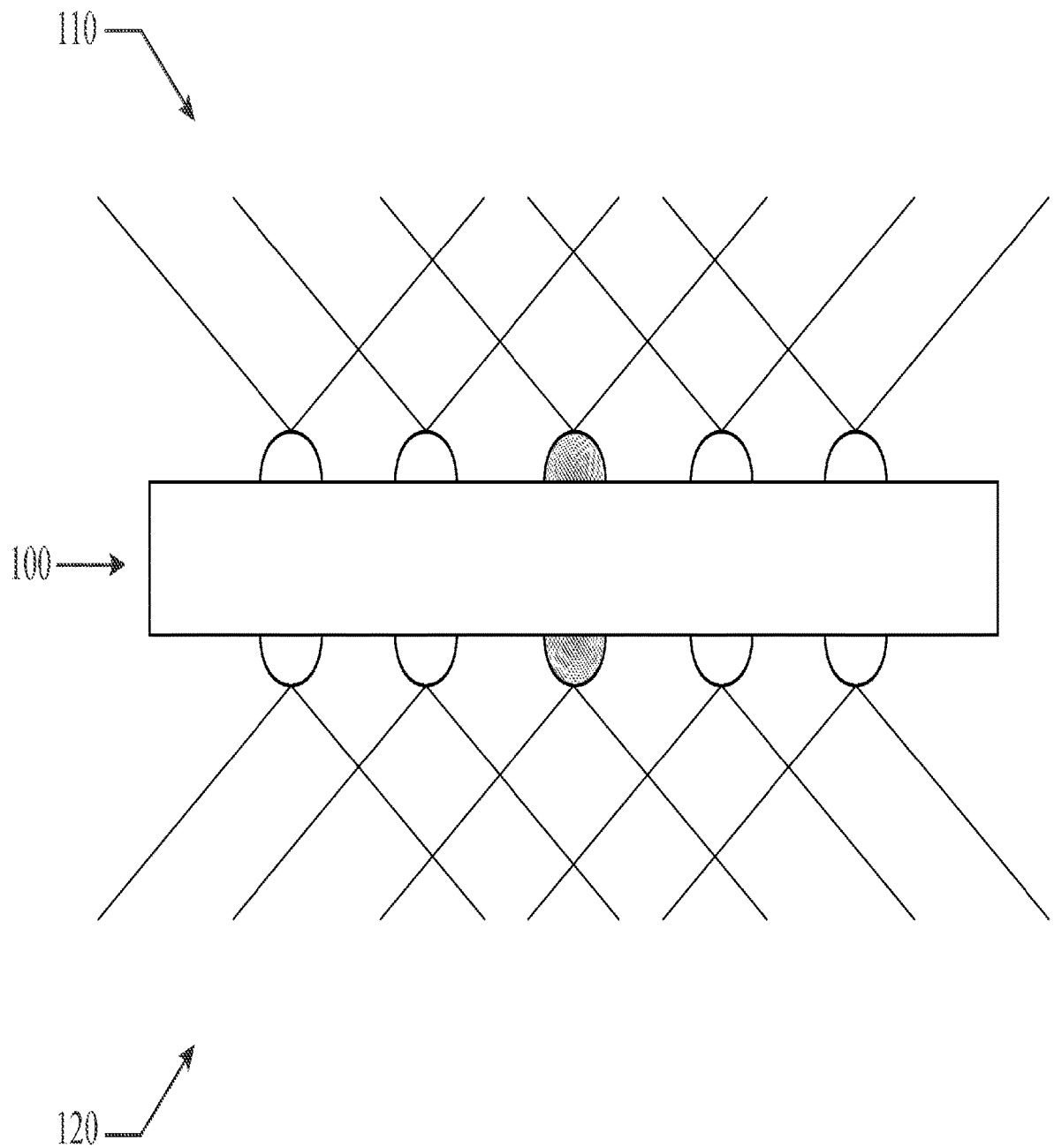
FIG. 2C shows the light spread from the dual multi-colored lights on both sides of the module.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.

1. blue-green LED approximately 450 to approximately 550 nm
2. UV-LED approximately 365 nm
3. Light modules/fixture
40 fourth embodiment multi-color lights on sticky paper/card
44 replaceable sticky paper/card
50 fifth embodiment suction fan and screen capture cage
55 suction fan
56 screened capture cage
57 fine mesh bag
60 sixth embodiment electric charged cage and collection tray
64 alternating positive and negatively charged electric wires
100 second embodiment of FIG. 2B
110 light spread from each LED on one side of module
120 light spread from each LED on opposite side of module
700 seventh embodiment
703 Light modules/fixture
710 left end blue/green LED (light emitting diode).
720 first UV (ultraviolet) LED (light emitting diode)
730 second UV (ultraviolet) LED (light emitting diode)
740 third UV (ultraviolet) LED (light emitting diode)
750 fourth UV (ultraviolet) LED (light emitting diode)
760 right end blue/green LED (light emitting diode).
800 eighth embodiment
803 Light modules/fixture
810 first blue/green LED (light emitting diode).
820 second blue/green LED (light emitting diode).
830 third blue/green LED (light emitting diode).
840 fourth blue/green LED (light emitting diode).
850 plurality of UV (ultraviolet) LEDs (light emitting diodes FIG. 1A is a front side view of a first embodiment of an insect attractive lights module arrangement combination of dual multi-colored lights combining blue/green LED (light emitting diodes) with UV (ultraviolet) LEDs (light emitting diodes) for attracting insects to the lights and capturing the insects.

FIG. 1B is a top view of the module of the first embodiment of FIG. 1A showing the arrangement combination of dual multi-colored lights on both sides of the module 3.

Referring to FIGS. 1A-1B, a light module/fixture 3 to house electronics and circuitry can be used as a mount for mounting a first plurality dual multi-colored lights combining blue/green LED (light emitting diodes) with UV (ultraviolet) LEDs (light emitting diodes) for attracting insects to the lights.

In this embodiment a centrally located blue-green LED (light emitting diodes) 1 can be located on opposite sides of the module/fixture 4. The blue-green LED can emit light between approximately 45 nm to approximately 550 nm. To each side of the blue-green LED 1 can be at least two or more UV (ultraviolet)-LED (light emitting diodes) each have a wavelength of approximately 365 nm.

Each of the LEDS 1, 2 can include novel lens on the emission side of the LEDs that would not cut down on the intensity of the light As described above, U.S. Pat. No. 9,706,764 to Koo et al.; U.S. Pat. No. 9,717,228 to Koo et al.; and 9,832,986 to Koo et al., which are incorporated by reference.

The UV (ultra violet) LED (light emitting diodes) in these devices are generally limited to wavelengths of between 335 to 395 nm. However, these limited wavelengths would clearly limit the visible light wavelength attractive to insects.

A publication, Muir et al., Aedes aegypti (Diptera: Culicidae) Vision: Spectral Sensitivity and Other Perceptual Parameters of the Female Eye, J. Med., Entomol, pages 278-281, 1992. The Muir paper teaches us that mosquito eyes are capable so detecting light over a wide range of wavelengths (nm). It does not teach us which wavelengths are preferred or cause aversion. Our optimized trap would utilize ultraviolet and blue-green light to attract more insects than either color alone.

Each of the LEDS 1, 2 in FIGS. 1A-1B can include novel lens on the emission side of the LEDs that would not cut down on the intensity of the light to allow for each LED to emit in a broad spread of at least 120 degrees in multi-colors to broaden the attraction effect for insects. And the arrays of LEDS 1, 2 placed on both sides of a module/fixture 4 attracts insects in opposite directions, which is novel. By placing the LEDs in opposite directions on the module, an almost 360 degrees spread of light is achieved. This configuration would attract insects from all possible directions around a trap.

The LEDs 1, 2 and/or different arrays of LEDs can be individually tunable to different selected wavelengths for both different insects and different species as needed.

The tunable LEDs can be accomplished by various techniques, such as those shown and described in U.S. Pat. No. 6,357,889 to Duggal et al., which is incorporated by reference.

Power for the LEDs can be supplied through wall plug power sources, such as 110, 220 volts, and the like. Possible battery power sources can be used.

Second Embodiment

FIG. 2A is a front side view of a second embodiment of an insect attractive lights module arrangement combination of dual multi-colored lights combining blue/green LED (light emitting diodes) with UV (ultraviolet) LEDs (light emitting diodes) for attracting insects to the lights and capturing the insects.

FIG. 2B is a top view of the module of the second embodiment of FIG. 2A showing the arrangement combination of dual multi-colored lights on both sides of the module.

FIG. 2C shows the light spread from the dual multi-colored lights on both sides of the module 3 in the second embodiment shown in FIG. 2B.

Overlapping light spread 110 can be seen from each LED on one side of module. Overlapping light spread 20 can be seen from each LED on opposite side of module.

Referring to FIGS. 2A-2C, this arrangement can include two UV-LEDS 2 to each side of a centrally located Blue-green LED 1.

Third Embodiment

FIG. 3A is a front side view of a third embodiment of an insect attractive lights module arrangement combination of dual multi-colored lights combining blue/green LED (light emitting diodes) with UV (ultraviolet) LEDs (light emitting diodes) for attracting insects to the lights and capturing the insects.

FIG. 3B is a top view of the module of the third embodiment of FIG. 3A showing the arrangement combination of dual multi-colored lights on both sides of the module.

Referring to FIGS. 3A-3B, this arrangement can include 1 UV-LED 2 to each side of a centrally located Blue-green LED 1.

All the embodiments allow for overlapping light spreads from the LEDs on both sides of the module/fixture.

While the above FIGS. 1A-3B show arrangements of three embodiments of dual multi-colored lights combining blue/green LED (light emitting diodes) with UV (ultraviolet) LEDs (light emitting diodes) for attracting insects to the lights, other arrangements can be used.

The various colors of lights do not have to be with the blue-green LED in the center. Also, the ratio of blue-green to ultraviolet LEDs could differ depending on the target species of insect.

Fourth Embodiment

Figure 4:
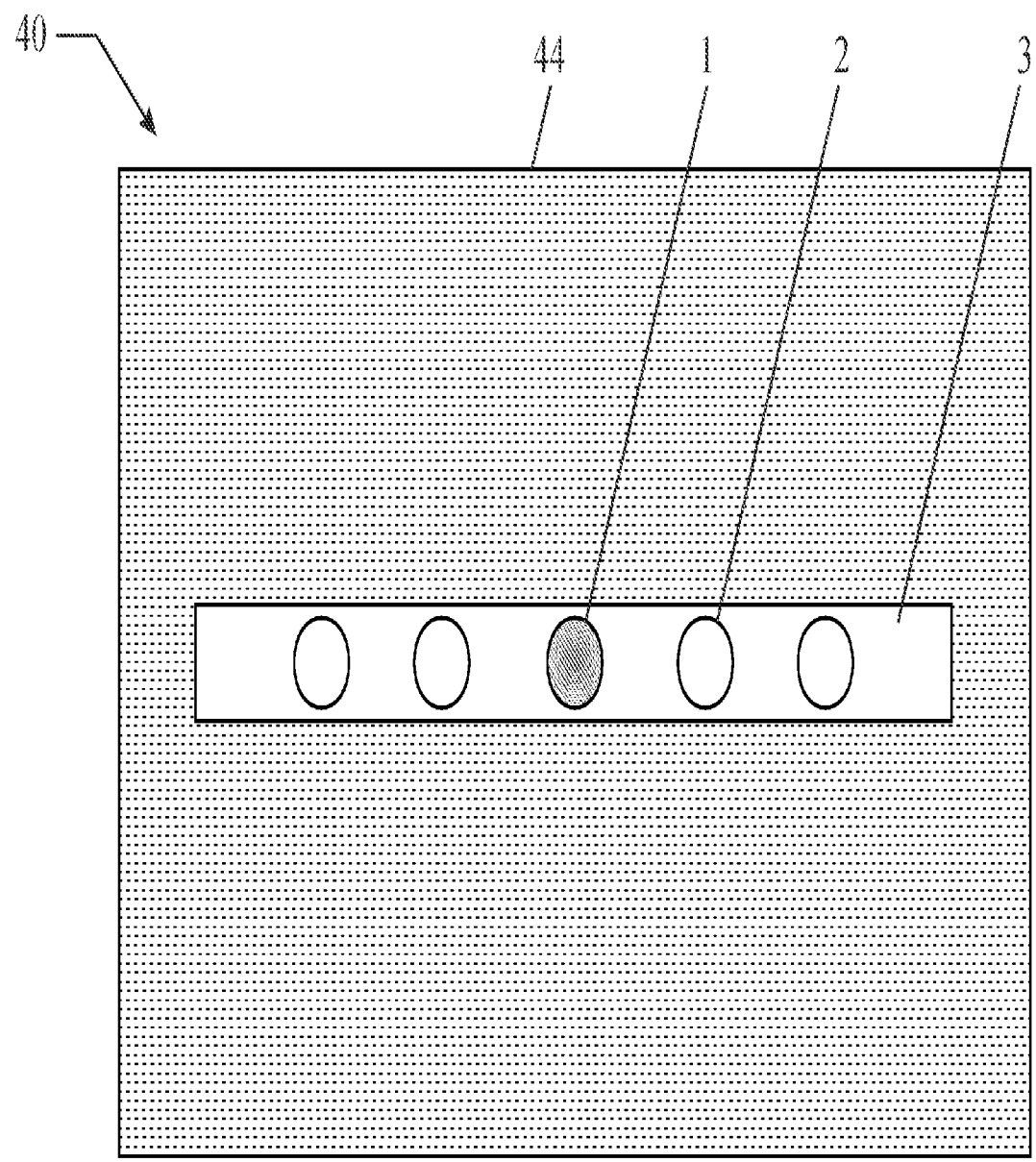
FIG. 4 is a fourth embodiment of locating the insect attractive lights module combination of dual multi-colored lights combining blue/green LED (light emitting diodes) with UV (ultraviolet) LEDs (light emitting diodes) for attracting insects to the lights of FIG. 2A and capturing the insects the middle of sticky paper/card.

FIG. 4 is a fourth embodiment 40 of locating the insect attractive lights module combination of dual multi-colored lights combining blue/green LED (light emitting diodes) 1 with UV (ultraviolet) LEDs (light emitting diodes) 2 for attracting insects to the lights of FIG. 2A and capturing the insects the middle of sticky paper/card 44. A module 3 having a Blue-green LED 1 can be centrally located on a module 3, with two UV-LEDs to each side, with the module on a midportion of a sticky paper/card 44. Insects attracted to LEDs 1, 2 can become stuck on the surface of the sticky/paper card 44.

Fifth Embodiment

Figure 5:
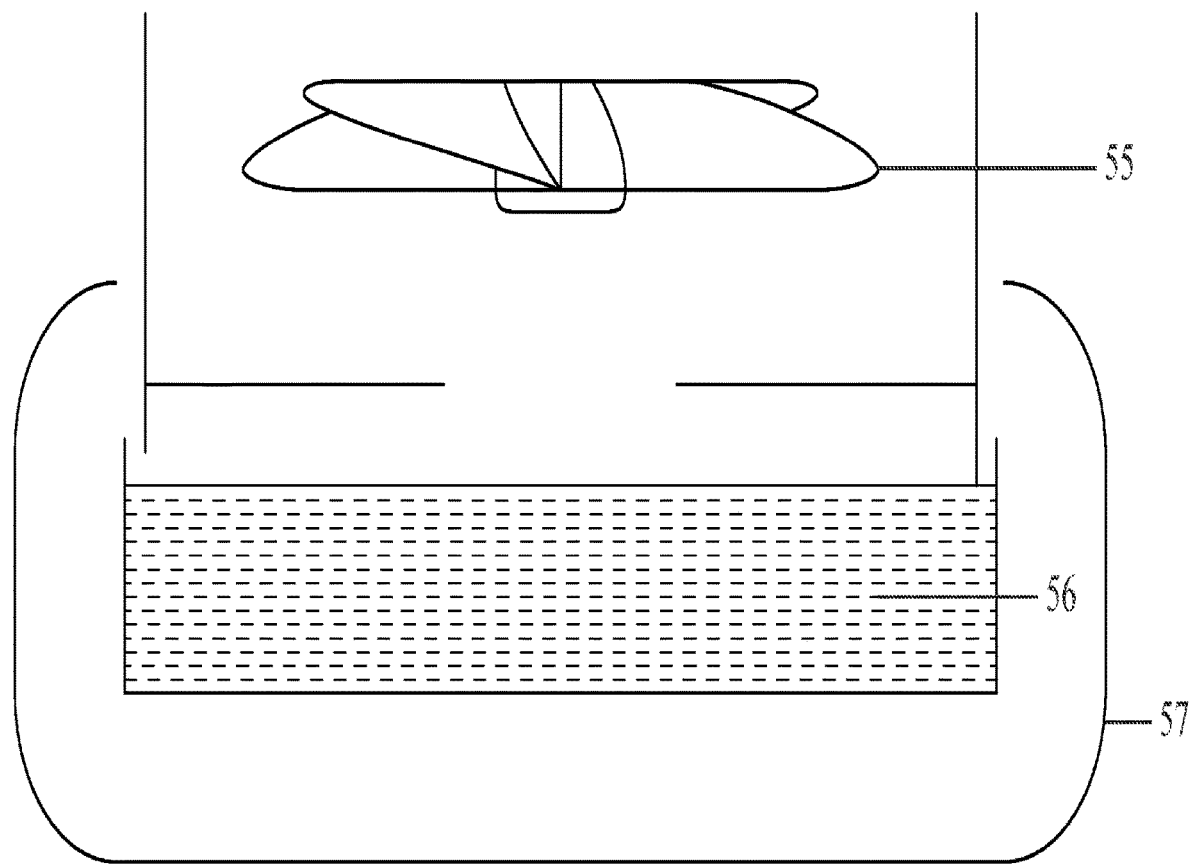
FIG. 5 shows a fifth embodiment of an insect attractive lights module combination of dual multi-colored lights combining blue/green LED (light emitting diodes) with UV (ultraviolet) LEDs (light emitting diodes) of FIG. 2A for attracting insects to the lights and capturing the insects with a suction fan and screen capture cage with fine mesh bag for sand fly capture.

FIG. 5 shows a fifth embodiment 50 of an insect attractive lights module combination 100 of dual multi-colored lights combining blue/green LED (light emitting diodes) with UV (ultraviolet) LEDs (light emitting diodes) of FIG. 2A for attracting insects to the lights and capturing the insects with a suction fan 55 and screen capture cage 56 with fine mesh bag 57 for sand fly capture.

A suction fan 55 can further pull insects attracted to multi-colored lights 1, 2 within a protective cover, and a screen capture cage 56 can capture the dead carcasses of the insects.

During experiments, a fine mesh bag 7 was used with an approximately 340 micron mesh bag wrapped around a cage. The mesh bag caught approximately 39,700 sand flies in a couple of nights. Using only the cage only approximately 500-700 sand flies were captured.

The approximately 340 micron mesh bag allowed the trap to capture biting, tiny, sand flies (biting midges). In a one week period a trap with standard mesh screening to contain mosquitoes only caught approximately 300 to approximately 400 sand flies. When an approximately 340 micron mesh bag was placed over the screened cage, it caught approximately 40,000 sand flies. In other words, the mesh bag improved sand fly catch by more than 99%.

The 340 micron mesh can be placed as a bag over an existing cage to convert the light trap from capturing only mosquitoes to also include sand flies, or the mesh can replace the mesh on the cage to capture both sand flies and mosquitoes.

Sixth Embodiment

Figure 6:
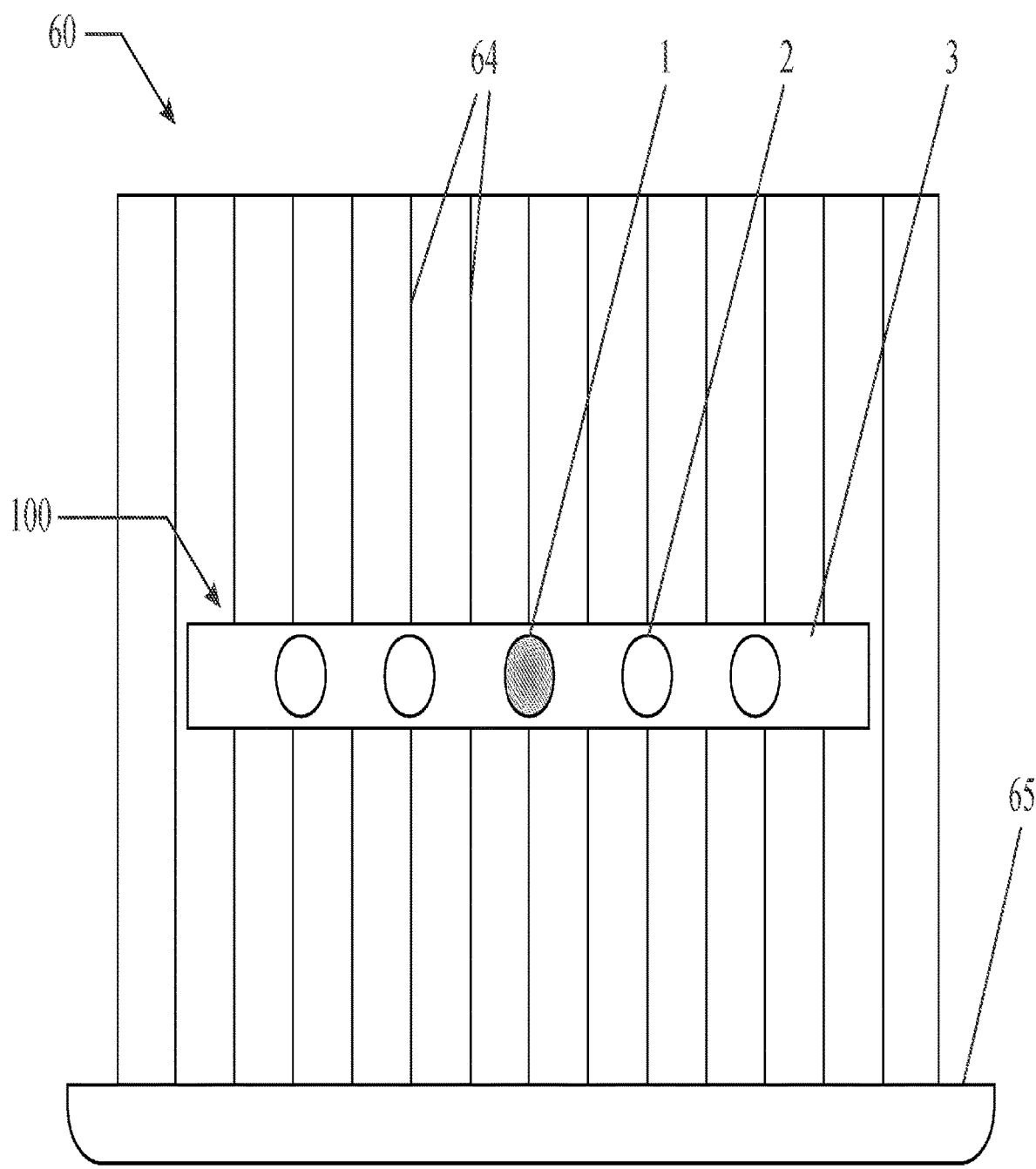
FIG. 6 shows a sixth embodiment of an insect attractive lights module combination of dual multi-colored lights combining blue/green LED (light emitting diodes) with UV (ultraviolet) LEDs (light emitting diodes) of FIG. 2A for attracting insects to the lights and capturing the insects with electric light trap in electric charged cage and collection tray

FIG. 6 shows a sixth embodiment 60 of an insect attractive lights module 100 combination of dual multi-colored lights combining blue/green LED (light emitting diodes) 1 with UV (ultraviolet) LEDs (light emitting diodes) 2 of FIG. 2A for attracting insects to the lights 1, 2 and capturing the insects with an electric light trap in electric charged cage and collection tray 65.

A bug zapper having an electrically conductive grill with alternating positive and negatively charged electric wires 64 can have a module/fixture 100 (from FIG. 2A-2C) with LEDs 1, 2 such as those shown and described in mounted inside of the housing having a grill of wires 64.

Insects attracted to the LEDs 1, 2 on the module/fixture 100 can be killed by the electrical grill of wires 64 and collected in a trap 65 underneath.

From Jul. 26, 2021 through Aug. 11, 2021, the subject inventors performed a field trial was conducted in Vero Beach, Florida to compare the results of different light traps. The initial night of installation was Jul. 25, 2021, and the traps were removed from the field on Aug. 12, 2021. Data was collected over 12 days and included overall biomass (grams) of arthropods caught in each trap and the number and species of mosquitoes caught per trap.

There were 4 trap types in the study as follows:
1. CDC Light Trap as a standard
2. SV Original: UV LED 10 bulbs wavelength 365 nm
3. SV Blue Light: 8 UV bulbs as above with 2 Blue LED at 455 nm
4. DynaTrap 1 acre trap: Fluorescent UV light The SV+B is the multicolor mosquito light trap. Overall, the traps caught 19 different species in 6 different genera. The CDC traps caught fewer species than the other traps (10 species), but the rest of the traps showed no differences with the SV traps and the DT traps catching 12.3 and 13 species, respectively. The number of mosquitoes caught by the different traps was different with the SV Blue Light trap catching the most mosquitoes on 8 of the 12 nights of the trial. Traps also collected non-mosquito arthropods, called by-catch. The CDC traps caught no by-catch, but the other traps caught between ca. 200-300 grams of by-catch over the course of the trial. SV Blue Light caught the most by-catch followed by SV Original and then DynaTrap.

Figure 7:
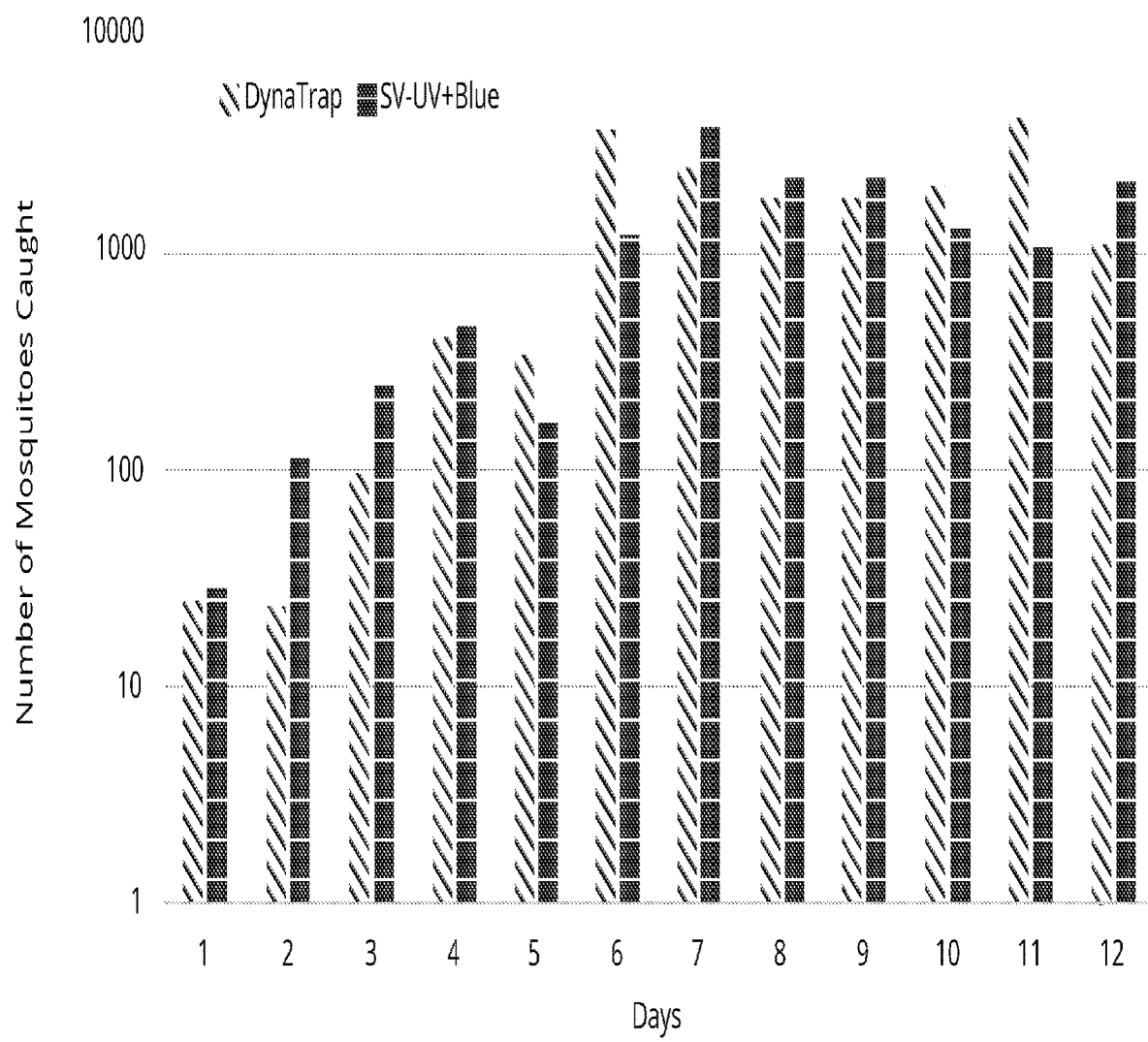
FIG. 7 is a bar graph comparing a prior art light trap with the multi-color insect light trap of the subject invention over twelve days in August 2021.

FIG. 7 is a bar graph comparing a prior art light trap (Dyna Trap with the multi-color insect light trap (SV–UV+Blue) of the subject invention over twelve days in August 2021. The bar graph shows the days that either the Dynatrap (DYN) or the SV UV+Blue light trap caught more mosquitoes. The SV UV+Blue light trap caught more mosquitoes on 8 of the 12 nights or approximately 67% of the time.

Seventh Embodiment

Figure 8:
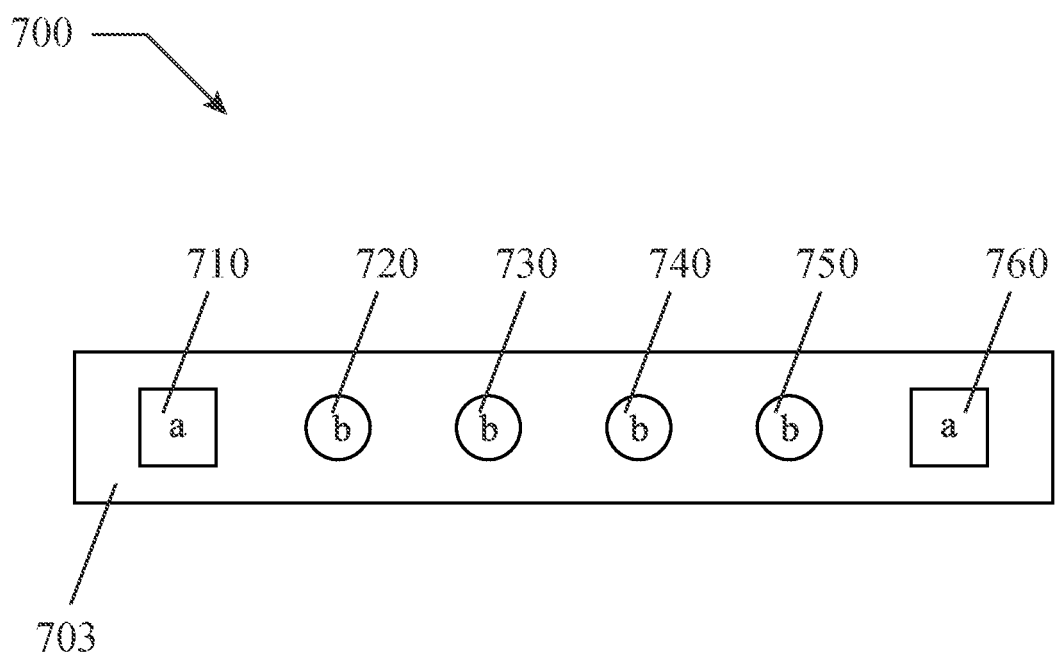
FIG. 8 shows a seventh embodiment of an insect attractive lights module with a plurality of UV (ultraviolet) LEDs (light emitting diodes) between blue/green LED (light emitting diodes).

FIG. 8 shows a seventh embodiment 700 of an insect attractive lights module with a plurality of UV (ultraviolet) LEDs (light emitting diodes) between blue/green LED (light emitting diodes).

Referring to FIG. 8, a module/fixture 703 can be similar to the module/fixture 3 shown and described in the previous embodiments.

On one side of the module/fixture 703 can mounted a left end blue/green LED (light emitting diode), 710 and a mounted right end blue/green LED (light emitting diode) 760 similar to the blue/green LEDs (light emitting diodes), previously described. Between the left end blue/green LED (light emitting diode), 710 and the right end blue/green LED (light emitting diode) 760, can be mounted a plurality of UV (ultraviolet) LEDs (light emitting diodes) 720, 730, 740, 750.

While four UV (ultraviolet) LEDs (light emitting diodes) 720, 730, 740, 750 are shown, the number of UV (ultraviolet) LEDs (light emitting diodes) can be any number more than the number of blue/green LEDs (light emitting diodes).

For example, the number of UV (ultraviolet) LEDs (light emitting diodes) can be three, four, or more in this embodiment if there are two end blue/green LEDs (light emitting diodes), Additional configurations, can include one end/blue/green LED (light emitting diode), and two or more right UV (ultraviolet) LEDs (light emitting diodes), as well as opposite arrangements, and the like.

The arrangement of UV (ultraviolet) LEDs (light emitting diodes) and the blue/green LEDs (light emitting diodes) can be on one face or on opposite faces of the module/fixture 703.

Although four UV (ultraviolet) LEDs (light emitting diodes) are shown mounted between each pair of blue/green LEDs (light emitting diodes), there can be other arrangements.

For example, there can be at least three or more UV (ultraviolet) LEDs (light emitting diodes) between each pair of blue/green LEDs (light emitting diodes), The seventh embodiment 700 can be incorporated into the embodiment 50 shown in FIG. 5, where the module/fixture 703 is substituted for the module/fixture 3.

The seventh embodiment 700 can also be incorporated into the embodiment shown and described in FIG. 6.

Eighth Embodiment

Figure 9:
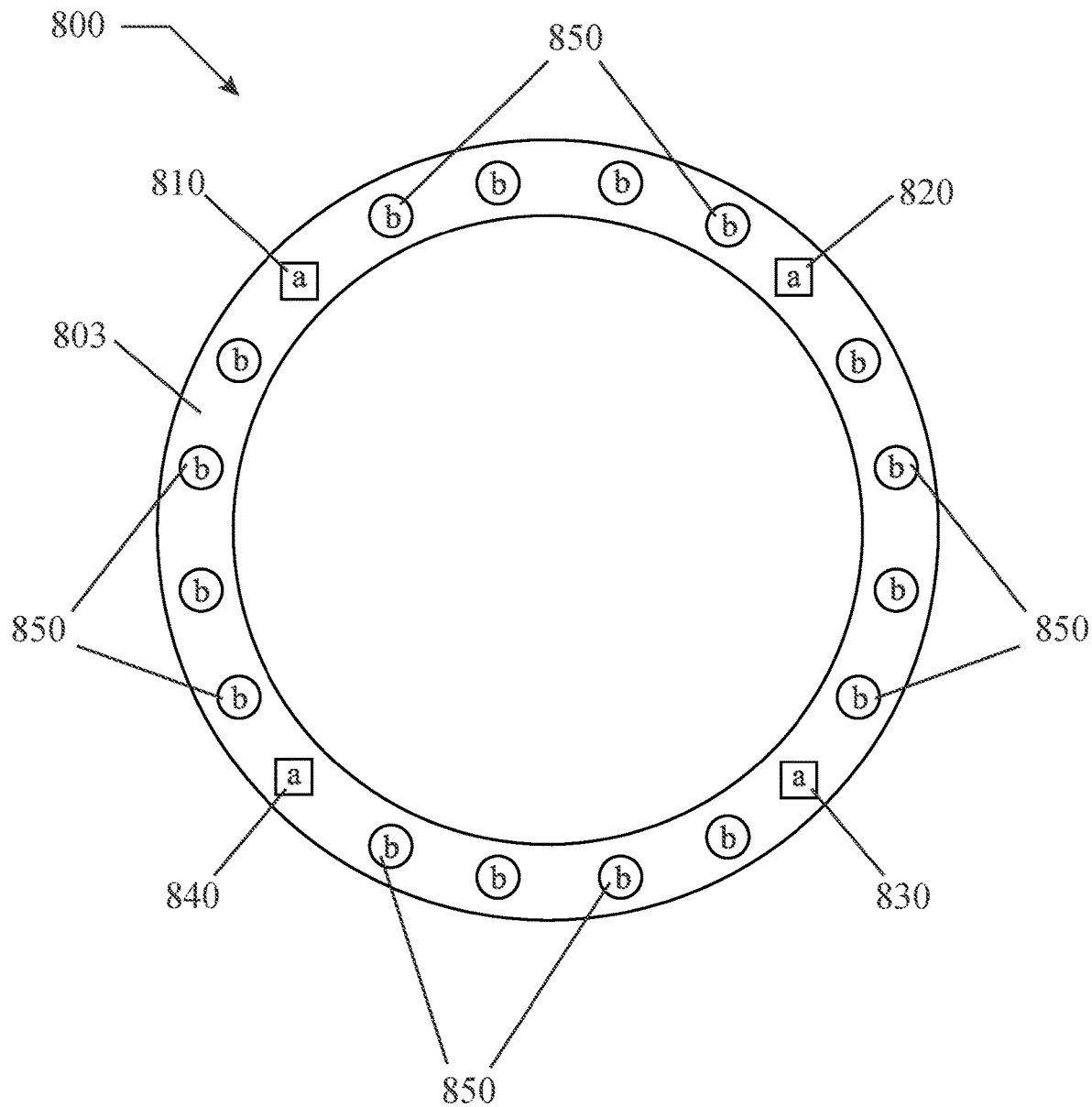
FIG. 9 shows an eighth embodiment of an insect attractive module having a ring shape with space apart blue/green LED (light emitting diodes), and a plurality of UV (ultraviolet) LEDs (light emitting diodes) positioned between each pair of blue/green LED (light emitting diodes)

FIG. 9 shows an eighth embodiment 800 of an insect attractive module 803 having a ring shape with spaced apart blue/green LED (light emitting diodes), and a plurality of UV (ultraviolet) LEDs (light emitting diodes) positioned between each pair of blue/green LEDs (light emitting diodes).

The ring module 803 can have a plurality of spaced apart blue/green LEDs (light emitting diodes) 810, 820, 830, 840 mounted thereon, and a plurality of UV (ultraviolet) LEDs (light emitting diodes) 850 mounted between each pair of blue/green LEDs (light emitting diodes).

The arrangement of UV (ultraviolet) LEDs (light emitting diodes) and the blue/green LEDs (light emitting diodes) can be on one face or on opposite faces of the module/fixture 803.

The middle of the ring module/fixture 803 can be hollow so that air can pass through the ring module/fixture 803.

The eighth embodiment 800 can be incorporated into the embodiment 50 shown in FIG. 5, where the module/fixture 803 is substituted for the module/fixture 3, and the fan 55 pulls air and insects through the ring module/fixture 803 to become trapped in the fine mesh bag 57.

The eighth embodiment 800 can also be incorporated into the embodiment shown and described in FIG. 6.

While the eight embodiment 800 shows a ring shaped module/fixture with a hollow center, the module/fixture can alternatively be a solid disc shape.

While the above embodiments show and describe configurations of blue/green LEDs (light emitting diodes) and a UV (ultraviolet) LEDs (light emitting diodes), the invention can cover additional configurations that are not disclosed. For example, other configurations of blue/green LEDs (light emitting diodes) can be placed to the side and UV (ultraviolet) LEDs (light emitting diodes) placed to a center can be used.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The term "approximately" is similar to the term "about" and can be +/−15% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A dual multi-colored light combining assembly of blue/green LED (light emitting diodes) with UV (ultraviolet) LEDs (light emitting diodes) for attracting insects to the lights and capturing the insects, comprising:
   a module/fixture having at least one centrally located blue-green LED for emitting light in a wavelength of approximately 450 nm to approximately 550 nm in in an approximately 180 degrees spread therefrom;
   at least one left side UV-LED to a left side of the at least one centrally located blue-green LED for emitting a light in a wavelength of approximately 365 nm in an approximately 180 degrees spread therefrom;
   at least one right side UV-LED to a right side of the at least one centrally located blue-green LED for emitting a light in a wavelength of approximately 365 nm in an approximately 180 degrees spread therefrom, wherein a ratio of all UV-LEDS is greater than the at least one centrally located blue-green LED.

2. A dual multi-colored light combining assembly of blue/green LED (light emitting diodes) with UV (ultraviolet) LEDs (light emitting diodes) for attracting insects to the lights and capturing the insects, comprising:
   a module/fixture;
   at least one left end blue-green LED (light emitting diode) mounted on the module/fixture;
   at least one right end blue-green LED (light emitting diode) mounted on the module/fixture; and
   a plurality of UV (ultraviolet) LEDs (light emitting diodes) mounted between the at least one left end blue-green LED (light emitting diode) and the at least one right end blue-green LED (light emitting diode), wherein each UV (ultraviolet) LED (light emitting diode) is for emitting a light in a wavelength of approximately 365 nm in an approximately 180 degrees spread therefrom, and each blue-green LED is for emitting light in a wavelength of approximately 450 nm to approximately 550 nm in an approximately 180 degrees spread therefrom.

3. The dual multi-colored light combining assembly of claim 2, wherein the
   plurality of UV (ultraviolet) LEDs (light emitting diodes) greater than the at least one left end blue/green LED (light emitting diode) and the at least one right end blue-green LED (light emitting diode).

4. The dual multi-colored light combining assembly of claim 2, wherein each
   Blue/green LED (light emitting diode), and each UV (ultraviolet) LEDs (light emitting diodes) are located on one side face of the module/fixture.

5. The dual multi-colored light combining assembly of claim 2, wherein each
   Blue/green LED (light emitting diode), and each UV (ultraviolet) LEDs (light emitting diodes) are located on opposing side faces of the module/fixture.

6. A dual multi-colored light combining assembly of blue/green LED (light emitting diodes) with UV (ultraviolet) LEDs (light emitting diodes) for attracting insects to the lights and capturing the insects, comprising:
   a ring shaped module/fixture;
   a plurality of spaced apart blue-green LEDs (light emitting diodes) mounted on the ring shaped module/fixture; and
   a plurality of UV (ultraviolet) LEDs (light emitting diodes) mounted between each pair of blue-green LEDs (light emitting diodes), wherein each UV (ultraviolet) LED (light emitting diode) is for emitting a light in a wavelength of approximately 365 nm in an approximately 180 degrees spread therefrom, and each blue-green LED is for emitting light in a wavelength of approximately 450 nm to approximately 550 nm in in an approximately 180 degrees spread therefrom.

7. The dual multi-colored light combining assembly of claim 6, wherein the plurality of UV (ultraviolet) LEDs (light emitting diodes) is greater than two UV (ultraviolet) LEDs (light emitting diodes).

8. The dual multi-colored light combining assembly of claim 6, wherein each
   Blue/green LED (light emitting diode), and each UV (ultraviolet) LEDs (light emitting diodes) are located on one side face of the module/fixture.

9. The dual multi-colored light combining assembly of claim 6, wherein each
   Blue/green LED (light emitting diode), and each UV (ultraviolet) LEDs (light emitting diodes) are located on opposing side faces of the module/fixture.

10. A dual multi-colored light combining assembly or blue/green LED (light emitting diodes) with UV (ultraviolet) LEDs (light emitting diodes) for attracting insects to the lights and capturing the insects, comprising:
    a module/fixture;
    a plurality of blue-green LEDs (light emitting diodes) for emitting light in a wavelength of approximately 450 nm to approximately 550 nm in in an approximately 180 degrees spread therefrom, mounted on the module/fixture; and
    a plurality of UV (ultraviolet) LEDs (light emitting diodes) for emitting a light in a wavelength of approximately 365 nm in an approximately 180 degrees spread therefrom, mounted on the module/fixture;

a housing for supporting the module/fixture above a fan which pulls insects into the housing;

a capture cage beneath the fan for capturing the insects; and a fine mesh bag about a portion of the capture cage for capturing sand flies.

11. The dual multi-colored light combining assembly of claim 10, wherein the fine mesh bag includes an approximately 340 micron mesh screen.

12. The dual multi-colored light combining assembly of claim 10, wherein the plurality of UV (ultraviolet) LEDs (light emitting diodes) is greater than the plurality of blue-green LEDs (light emitting diodes).

13. The dual multi-colored light combining assembly of claim 12, wherein the plurality of UV (ultraviolet) LEDs (light emitting diodes) and the plurality of blue-green LEDs (light emitting diodes), are place on one side of a module/fixture.

14. The dual multi-colored light combining assembly of claim 12, wherein the plurality of UV (ultraviolet) LEDs (light emitting diodes) and the plurality of blue-green LEDs (light emitting diodes), are placed on opposite sides of a module/fixture.

15. The dual multi-colored light combining assembly of claim 12, wherein the plurality of UV (ultraviolet) LEDs (light emitting diodes) and the plurality of blue-green LEDs (light emitting diodes), are place on a rectangular module/fixture.

16. The dual multi-colored light combining assembly of claim 12, wherein the plurality of UV (ultraviolet) LEDs (light emitting diodes) and the plurality of blue-green LEDs (light emitting diodes), are place on a ring shaped module/fixture.

* * * * *